United States Patent [19]

Brennan et al.

[11] 3,862,145

[45] Jan. 21, 1975

[54] PREPARATION OF PHTHALIC ANHYDRIDE BY HEATING TRIMELLITIC ACID IN THE PRESENCE OF A CATALYST

[75] Inventors: Harry M. Brennan, Naperville; Douglas P. Lamb, Mount Prospect, both of Ill.

[73] Assignee: Standard Oil Company, Chicago, Ill.

[22] Filed: Sept. 27, 1971

[21] Appl. No.: 184,232

[52] U.S. Cl............. 260/346.4, 260/346.7, 260/522
[51] Int. Cl......................... C07c 63/18, C07c 63/17
[58] Field of Search........................ 260/346.7, 522

[56] References Cited
UNITED STATES PATENTS

| | | | |
|---|---|---|---|
| 2,958,701 | 11/1960 | McKinnis | 260/346.7 |
| 3,027,400 | 3/1962 | McKinnis et al. | 260/346.3 X |
| 3,032,559 | 5/1962 | Hirsch et al. | 260/346.3 |
| 3,261,846 | 7/1966 | Meyer | 260/346.3 X |

*Primary Examiner*—Henry R. Jiles
*Assistant Examiner*—Bernard I. Dentz
*Attorney, Agent, or Firm*—Gunar J. Blumberg; Arthur G. Gilkes; William T. McClain

[57] ABSTRACT

Phthalic anhydride is prepared by heating trimellitic acid in the presence of certain metal catalysts such as cobalt, manganese, and cerium as either salts or in the oxide form, and bromine. The trimellitic acid and catalyst are heated and an inert gas is passed through the molten mass to produce a product containing a high concentration of orthophthalic acid which upon further heating yields orthophthalic anhydride or phthalic anhydride.

4 Claims, No Drawings

PREPARATION OF PHTHALIC ANHYDRIDE BY HEATING TRIMELLITIC ACID IN THE PRESENCE OF A CATALYST

BACKGROUND OF INVENTION

The preparation of phthalic anhydride dates back to the oxidation of 1,2,3,4-tetrachloronaphthalene with nitric acid by Laurent in 1836. Since that time phthalic acids and their respective anhydrides have become important organic building-blocks for plasticizers, alkyd resins, and condensation polymers of various types. The polyesters and polyamides are the most common of the polymers and are used in the production of fibers, film, surface coatings, and molding polymers. It is used in the production of diesters of monohyric aliphatic alcohols. These esters are widely used as plasticizers for various types of synthetic resins or plastics. It is also used in the preparation of alkyd resins. These are formed by reaction of phthalic anhydride with polyhydric alcohols such as glycerol, pentaerythritol, or other suitable glycols. Alkyd resin vehicles impart to the finished coating many desirable properties, among which may be cited "quick dry" characteristics, outstanding weather and exceptional resistance, flexibility, and excellent adhesion to the surface to be protected. Phthalic anhydride is also used in the preparation of unsaturated polyester resins. Unsaturated polyester resins are prepared from a glycol, phthalic anhydride, and an unsaturated acid or anhydride. Among the most important uses of the unsaturated polyester resins are for structural building parts such as corrugated sheet, and in boat hulls.

Phthalic acid and its anhyride have been prepared by several different processes, including the low-temperature fixed-bed air oxidation of naphthalene, or o-xylene in the presence of a catalyst, such as $V_2O_5$ on silica gel with 20-30% potassium sulfate; the high-temperature fixed-bed air oxidation of naphthalene or o-xylene in the presence of a catalyst; the fluid-bed oxidation of naphthalene, coal-tar naphthalene, or o-xylene, in the presence of a catalyst; the liquid-phase air-oxidation of mixed xylenes in a solvent such as acetic acid and with a bromine-activated heavy-metal catalyst system.

U.S. Pat. No. 2,734,914, issued Feb. 14, 1956, teaches that trimellitic anhydride can be decarboxylated by heating the pure or crude trimellitic acid with a substantially neutral aqueous reagent at elevated temperatures and pressures until substantial monodecarboxylation has occurred, and then separating the resulting acid mixture to obtain terephthalic acid and isophthalic acid as the primary products. This process can be illustrated by the following chemical reactions:

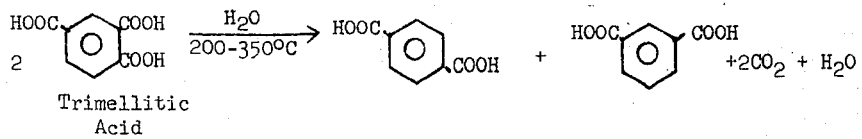

Trimellitic Acid

The examples cited indicate that this method produces a relatively low concentration of orthophthalic acid and that the primary products are terephthalic and isophthalic acids.

SUMMARY OF INVENTION

Our process consists of a novel method for monodecarboxylating trimellitic acid, in the presence of a catalyst. The monodecarboxylation of trimellitic acid is performed in the presence of certain heavy metals and bromine as a catalyst. The reaction results in a product of almost entirely orthophthalic acid, with slight amounts of terephthalic acid, isophthalic acid, benzoic acid, trimellitic acid, and methyl dibasic acids as by-products. The basic reaction can be illustrated as:

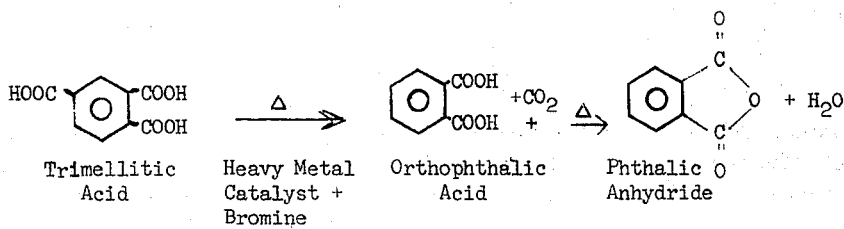

Trimellitic Acid / Heavy Metal Catalyst + Bromine / Orthophthalic Acid / Phthalic Anhydride The presence of the catalyst results in a monodecarboxylation of trimellitic acid to form orthophthalic acid as an intermediate and upon further heating phthalic anhydride as the primary produt. The formation of terephtalic acid and isophthalic acid are substantially retarded.

DETAILED DESCRIPTION OF INVENTION

The invention relates to a process for the production of phthalic anhydride by heating trimellitic acid in the presence of certain metallic catalysts. The trimellitic acid is formed from the liquid phase oxidation of 1,2,4-trialkylbenzene with gaseous oxygen in the presence of a solvent such as acetic acid and a catalyst system provided by a heavy metal and bromine. This process is more particularly described in U.S. Pat. No. 3,161,658. Acceptable commercial oxidation of 1,2,4-trialkylbenzene can be carried out at temperatures in the range of 325°–460° F. and pressures to maintain a liquid phase. Suitable pressures for commercial operations are in the range of 300–500 psig. The oxidation of 1,2,4-trialkylbenzene can be accomplished at lower temperatures than 320° F., as low as 120° F., with pure or commercial oxygen or air. By the proper selection of heavy metal concentration and bromine concentration based on the the $C_9$ aromatic fraction containing 1,2,4-trialkylbenzene, the 1,2,4-trialkylbenzene can be converted to trimellitic acid in yields of from 80 up to about 90 percent of theory.

The catalyst system can be provided by the use of a heavy transitional metal selected from metals having atomic numbers of 13, 21 to 32, 39 to 51, 57 to 84, all inclusive and the actinide earths. The metals can be added in elemental form or as a soluble salt such as a chloride, bromide, acetate, nitrate, a chelate or as a part of an inorganic acid radical such as a chromate, vanadate, molybdate, etc. Of the heavy metals, cobalt, manganese and mixtures of these two alone or together with cerium are preferred. Likewise, bromine may be added as elemental or molecular bromine ($Br_2$), or an inorganic bromide such as HBr, sodium bromide, potassium bromate, ammonium bromide, nickel bromide, manganese bromide, cobalt bromide (the latter three will, of course, provide both heavy transitional metal and bromine) and organic bromides such as dibromoethane, tribromoethane, tetrabromoethane, bromoform, benzyl bromide, etc.

The ratios of heavy metal and bromine to $C_9$ aromatic hydrocarbon containing 1,2,4-trialkylbenzene are best expressed in weight concentration of the metals themselves and weight concentration of Br based on said $C_9$ aromatic fraction. These concentrations are from 0.25 to 0.90 weight percent total metal, for example, calculated as $Co^{++}$ or $Mn^{++}$ or a combination thereof such as 0.10 $Co^{++}$ and 0.15 $Mn^{++}$ or 0.35 $Co^{++}$ and 0.55 $Mn^{++}$ or 0.2 $Co^{++}$ with 0.5 $Mn^{++}$ and 0.2 Ce percent by weight based on the $C_9$ aromatic hydrocarbon. Suitable bromine concentrations on the same weight percent basis are in the range of 0.4 to 1.1%.

After oxidation of the 1,2,4-trialkylbenzene, such as 1,2,4-trimethylbenzene (pseudocumene) in a process as described in U.S. Pat. No. 3,161,658, the reactor effluent either before or after partial crystallization of the trimellitic acid, is used to form the phthalic anhydride. Trimellitic acid from the reactor effluent may be partially depressurized from 380 to 400 p.s.i.g. to a pressure in the range of from 50–150 p.s.i.g. and then discharged into the crystallization zone wherein cooling can be accomplished by internal cooling or by flashing off acetic acid solvent at further reduced pressure at one or more stages. Even upon cooling the reactor effluent or a concentrated reactor effluent to about 100° F., a substantial amount of trimellitic acid remains in solution. For example, when a reactor effluent containing 500 pounds acetic acid solvent, 200 pounds trimellitic acid, 50 pounds of aromatic intermediates in byproducts of oxidation together with the components of the catalyst system is cooled to about 100° F. to crystallize trimellitic acid therefrom, there remains dissolved in the acetic acid solvent 65 pounds of trimellitic acid, 32.5% of that formed in the oxidation step.

To produce phthalic anhydride, the above described reactor effluent is heated to a temperature necessary to remove all of the acetic acid and water, suitably to a temperature of 100°–200° C. The resulting mixture containing the catalyst is further heated to 300°–375° F. The overhead vapor product consists of small amounts of benzoic acid, isophthalic acid, methyl dibasic acids, trimellitic acids, and approximately 98% orthophthalic acid. Upon condensing the vapor and further heating the condensate to remove $H_2O$, the orthophthalic acid is converted to orthophthalic anhydride. While heating the reactor effluent containing the trimellitic acid, inert gas is passed through the mixture.

Alternatively, the reactor effluent is cooled to 100° F. and the trimellitic acid that crystallizes is separted by centrifugation. The mother liquor, containing a substantial amount of dissolved trimellitic acid, is then heated as described above, first to 100°–200° C. to remove water and acetic acid and then to 300°–375° C. to produce an overhead product rich in orthophthalic acid.

As a preferred method, phthalic anhydride can be prepared by subjecting psuedocumene to liquid phase oxidation in the presence of metallic catalysts and bromine as set forth above. The reactor effluent resulting from the oxidation process contains substantial amounts of trimellitic acid, mixed with lesser amounts of byproducts and side product. The reactor effluent is then concentrated by heating to a temperature range of 100°–150° C. to remove acetic acid and water. The concentrated effluent is then heated to temperature in the range of 300°–375° C., the preferred temperature being 325°–350° C. An inert gas is passed through the molten mixture. The overhead product is condensed and collected to yield a high percentage of orthophthalic acid, and lesser amounts of isophthalic acid, terephthalic acid, benzoic acid, methyl dibasic acid, and trimellitic acid. Upon further heating the orthophthalic acid yields phthalic anhydride. The invention is further illustrated in the following example.

EXAMPLE I

Pseudocumene was subjected to liquid phase oxidation in the presence of cobalt, manganese and cerium, as acetates and bromine in the form of an organic bromine compound. The resulting product consisted primarily of trimellitic acid, mixed with some byproducts. The reactor effluent contained the catalyst metals and bromine as well as water formed during the oxidation and the acetic acid used as solvent. Upon removal of water and acetic acid, the approximate percentage absorption of the effluent was as shown in Table I. Its melting point range was 185°–190° C. It had an approximate acid number of 720.

TABLE I

Trimellitic Mother Liquor Stripper Bottoms Composition

| Components by EGC Wt.% | |
|---|---|
| Acetic Acid | 1.33 |
| Benzoic Acid | 0.73 |
| Toluic Acid | 0.18 |
| Phthalic Acid | 3.16 |
| Isophthalic Acid | 2.30 |
| Terephthalic Acid | 1.01 |
| Methyl Dibasic Acid | 0.93 |
| Trimellitic Acid | 66.0 |
| Trimesic Acid | 0.43 |
| X-Ray Fluorescence, Wt.% | |
| Br | 2.00 |
| Co | 0.76 |
| Mn | 0.07 |
| Ce | 0.01 |
| Inert Material | 21.09 |
| Total | 100.00 |

The trimellitic mother liquor stripper bottom residue with the analysis as shown in Table I was heated to 340° C. ±10° and a small flow of nitrogen passing through the molten mix. The overhead product was collected and analyzed and found to have compositions as shown in Table II.

TABLE II

Concentration of Overhead Product

| | |
|---|---|
| Benzoic acid | 5.5 wt.% |
| Orthophthalic acid | 79.2 |
| Iso- and terephthalic acids | 0.9 |
| Methylphenyldibasic acids | 0.7 |
| Trimellitic acid | 6.0 |

What is claimed is:

1. A process for the preparation of orthophthalic acid or phthalic anhydride by heating trimellitic acid, formed from the liquid phase oxidation of 1,2,4-trialkylbenzene, in the presence of a catalyst system consisting of an element or mixture of elements selected from cobalt, manganese and cerium, and bromine, to a temperature in the range of 300°–325° C. to produce an overhead product consisting of a high concentration of orthophthalic acid, which upon further heating produces phthalic anhydride.

2. A process as set forth in claim 1 where the trimellitic acid and catalyst mixture is heated to a temperature in the range 330°–350° C.

3. A process as set forth in claim 1 wherein the trimellitic acid is formed from the liquid phase oxidation of 1,2,4-trimethylbenzene (pseudocumene), in the presence of cobalt, manganese, and cerium, as acetate and bromine in the form of an organic bromine compound as a catalyst.

4. A process as set forth in claim 1 where the metal catalyst is added in the elemental form, in the form of an oxide, or as a soluble salt, such as a chloride, a bromide, an acetate, a nitrate, a chelate, or as a part of an inorganic acid radical such as a chromate, vanadate, or molybdate, and the bromine catalyst may be added as elemental or molecular bromine ($Br_2$), or an inorganic bromide.

* * * * *

PO-1050
(5/69)

UNITED STATES PATENT OFFICE
CERTIFICATE OF CORRECTION

Patent No. 3,862,145                            Dated  January 25, 1975

Inventor(s) Harry M. Brennan; Douglas P. Lamb

It is certified that error appears in the above-identified patent and that said Letters Patent are hereby corrected as shown below:

Column 1, line 60 -- omit the word gel -- after the word silica

Column 2, line 50 - produt should be product

Column 3, line 66 - F. should be C.

Column 5, line 3 - and a should be with a

Column 6, line 9 - wherein should be where

Signed and sealed this 8th day of April 1975.

(SEAL)
Attest:

RUTH C. MASON
Attesting Officer

C. MARSHALL DANN
Commissioner of Patents
and Trademarks